(12) United States Patent
Maeda et al.

(10) Patent No.: US 11,378,442 B2
(45) Date of Patent: Jul. 5, 2022

(54) METHOD FOR COMPRESSING WIDEBAND SENSOR SIGNAL

(71) Applicant: Hitachi, Ltd., Tokyo (JP)

(72) Inventors: Daisuke Maeda, Mountain View, CA (US); Sudhanshu Gaur, Santa Clara, CA (US)

(73) Assignee: HITACHI, LTD., Tokyo (JP)

( * ) Notice: Subject to any disclaimer, the term of this patent is extended or adjusted under 35 U.S.C. 154(b) by 239 days.

(21) Appl. No.: 16/743,888

(22) Filed: Jan. 15, 2020

(65) Prior Publication Data

US 2021/0215531 A1 Jul. 15, 2021

(51) Int. Cl.
*G01H 1/14* (2006.01)
*B23Q 17/12* (2006.01)
*B23Q 17/09* (2006.01)

(52) U.S. Cl.
CPC ............ *G01H 1/14* (2013.01); *B23Q 17/0976* (2013.01); *B23Q 17/12* (2013.01)

(58) Field of Classification Search
CPC ....... G01H 1/14; B23Q 17/12; B23Q 17/0976
USPC ........................................................ 702/56
See application file for complete search history.

(56) References Cited

U.S. PATENT DOCUMENTS

| 2010/0076693 | A1* | 3/2010 | Liang | ................ | G06K 9/00516 |
| | | | | | 702/22 |
| 2011/0015899 | A1 | 1/2011 | Leigh | | |
| 2011/0209546 | A1 | 9/2011 | Seuthe | | |
| 2014/0324367 | A1* | 10/2014 | Garvey, III | ............ | G01D 18/00 |
| | | | | | 702/56 |

FOREIGN PATENT DOCUMENTS

| JP | 08029318 A | 2/1996 |
| JP | 2000515288 A | 11/2000 |
| JP | 2003528292 A | 9/2003 |
| JP | 2004117092 A | 4/2004 |
| JP | 2017120209 A | 7/2017 |

OTHER PUBLICATIONS

Japanese Office Action for related JP Application No. 2021-000538 dated Dec. 7, 2021, 8 pages.

* cited by examiner

*Primary Examiner* — Aditya S Bhat
(74) *Attorney, Agent, or Firm* — Procopio, Cory, Hargreaves & Savitch LLP

(57) ABSTRACT

Example implementations described herein are directed to systems and methods for extracting signal in the presence of noise for industrial IoT systems. Through the example implementations described herein, the high-frequency band signal of the sensor output can be maintained despite data compression, while also retaining information regarding the condition of the machine. Example implementations can also generate compressed data pairs to synchronized down-sampled envelopes and spectrum data.

12 Claims, 9 Drawing Sheets

METHOD FOR COMPRESSING WIDEBAND SENSOR SIGNAL

BACKGROUND

Field

The present disclosure is generally directed to Internet of Things (IoT) systems, and more specifically, to wideband sensor signal compression processing techniques.

Related Art

In the related art, there are implementations for transforming machine maintenance from human know-how-based schemes into IoT systems. Extracting signal that reflects a usage or a condition of a machine through sensors is utilized for such maintenance applications. However, in many cases, legacy machines that are already working in a production line are not equipped with such sensors since they were not designed to be integrated into the IoT system. Thus, such legacy machines rely on manual maintenance to maintain operations.

One problem regarding the design for IoT systems is the limitation of resources. To extract the machine information from the sensor signal (e.g., vibration signal, acoustic signal), a wideband sensor and data acquisition system (e.g. more than 10 kHz) is needed. This is because physical signals from a measurement target (e.g., such as a bearing or a cutting tool) tend to be modulated at a natural frequency of other mechanical parts of the machine. Thus, the signal frequency band may go to another frequency band which is higher than the original frequency band of the signal. Therefore, you will need a high sampling rate, practically more than 20-kHz, to capture such the modulated signal without aliasing that degrades the signal-to-ratio of the data.

In addition, it is known in related art implementations that monitoring a signal in the high frequency band is a method to detect a potential physical failure as early as possible. The reason for this is that the early phases of a mechanical failure develop high-frequency vibration or sound such as acoustic emission.

However, wideband monitoring (e.g., from DC to high frequency), will require abundant network capacity, storage capacity, and computer processing resources. As there is always a demand for cost reduction of IoT systems, reducing the requirements for computing resources while maintaining the amount of data and bandwidth, is the one major problem that should be resolved in the design process of an IoT system.

In the related art, there is a method that compares a current signal spectrum and a reference signal spectrum to detect a failure was disclosed. Further, there are related art systems and methods to extract envelopes of signals and applying down-sampling in order to reduce the amount and complexity of signal.

SUMMARY

Aspects of the present disclosure can include a method for managing sensor data from a machine having a plurality of machine states, the method involving decomposing sensor data into a plurality of band-limited data to generate a decomposed sensor data; and executing downsampling on each of the decomposed sensor data to generate downsampled decomposed sensor data; wherein the downsampling cycle is shorter than a duration of the each of the machine states.

Aspects of the present disclosure can include a non-transitory computer readable medium, storing instructions for managing sensor data from a machine having a plurality of machine states, the instructions involving decomposing sensor data into a plurality of band-limited data to generate a decomposed sensor data; and executing downsampling on each of the decomposed sensor data to generate downsampled decomposed sensor data; wherein the downsampling cycle is shorter than a duration of the each of the machine states.

Aspects of the present disclosure can include a system for managing sensor data from a machine having a plurality of machine states, the system involving means for decomposing sensor data into a plurality of band-limited data to generate a decomposed sensor data; and means for executing downsampling on each of the decomposed sensor data to generate downsampled decomposed sensor data; wherein the downsampling cycle is shorter than a duration of the each of the machine states.

Aspects of the present disclosure can include an apparatus for managing sensor data from a machine having a plurality of machine states, the apparatus involving a processor configured to decompose sensor data into a plurality of band-limited data to generate a decomposed sensor data; and execute downsampling on each of the decomposed sensor data to generate downsampled decomposed sensor data; wherein the downsampling cycle is shorter than a duration of the each of the machine states. The apparatus may facilitate a common enclosure for a processor integrated with a sensor configured to provide the sensor data.

DETAILED DESCRIPTION

Figure 1:
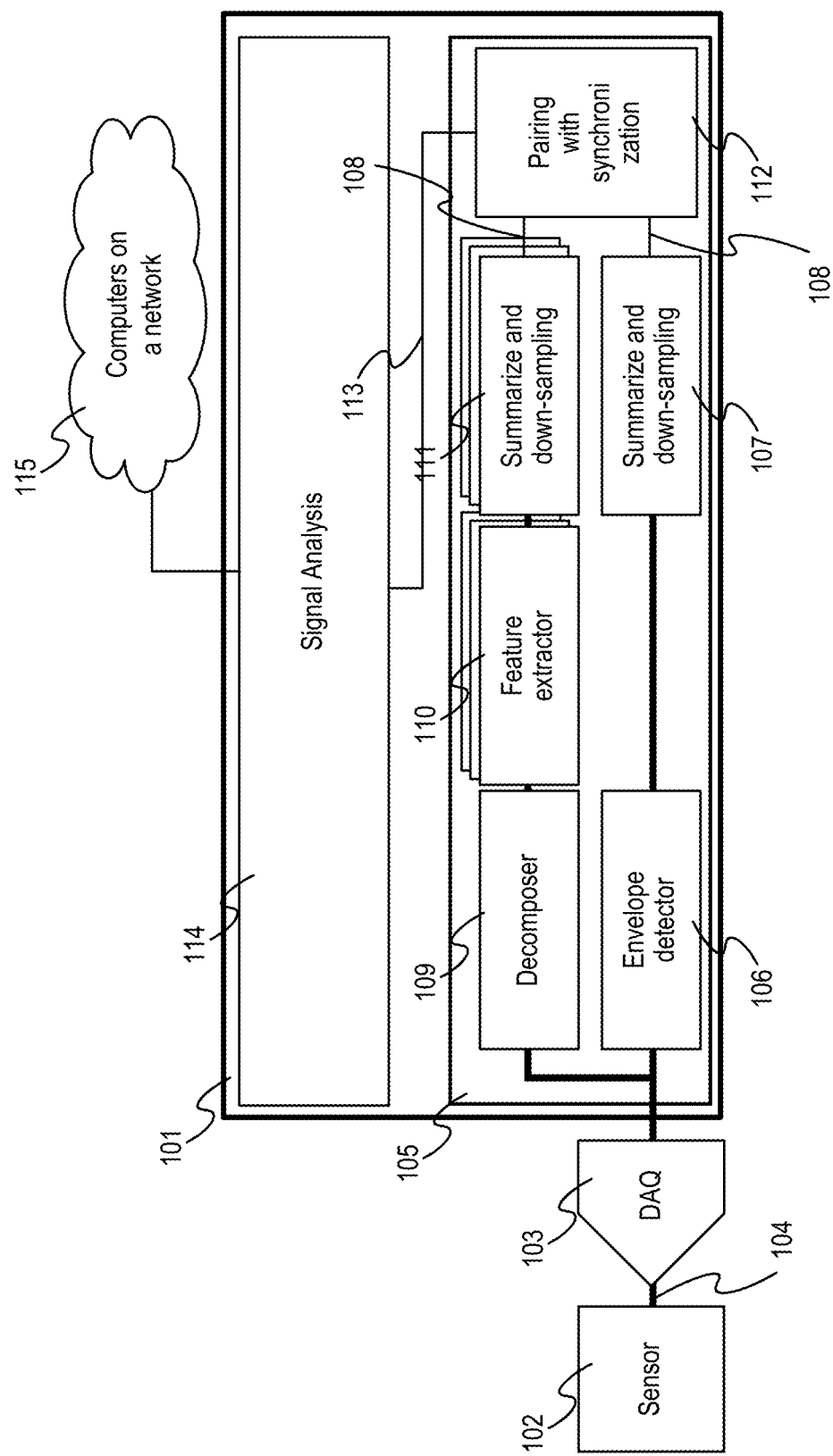
FIG. 1 illustrates an example block diagram of a local computer in a part of an IoT system with the signal processing method in accordance with an example implementation.

The following detailed description provides details of the figures and example implementations of the present application. Reference numerals and descriptions of redundant elements between figures are omitted for clarity. Terms used throughout the description are provided as examples and are not intended to be limiting. For example, the use of the term "automatic" may involve fully automatic or semi-automatic implementations involving user or administrator control over certain aspects of the implementation, depending on the desired implementation of one of ordinary skill in the art practicing implementations of the present application. Selection can be conducted by a user through a user interface or other input means, or can be implemented through a desired algorithm. Example implementations as described herein can be utilized either singularly or in combination and the functionality of the example implementations can be implemented through any means according to the desired implementations.

Example implementations described herein involve a signal processing method designed to reduce the requirement for computing resources while maintaining the amount of signal, especially for machine maintenance applications.

As will be described herein, signal refers to a physical quantity that is useful for an application. Natural phenomena such as vibration or acoustic signal can be referred to generally as signals. Voltage, current, or digitized values that are inside a sensor or a computer can be also referred to as signals.

As will be described herein, noise refers to physical quantities that are not useful for the application. In other words, they are generated from signal sources which are not of interest to the application. For example, when an application monitors the condition of a bearing, vibration caused by a cooling fan is "noise." Random noise such as thermal noise or quantization noise can be also referred as noise. Voltage, current, or digitized value that are inside a sensor or a computer can be also referred as noise.

As will be described herein, data refers to the combined physical quantities of signal and noise. Raw data is the data before applying any signal processing except for digitization. Signal processing does not only refer to processing of signal, but can also refer to processing of data.

In a first example implementation, there is a signal processing method for extracting and compressing information from a wideband sensor signal, in order to monitor a usage or a condition of a target which incurs vibration according to its usage or condition. In this example implementation, it is assumed that a monitoring target, such as a bearing or a cutting tool, develops higher vibration magnitude as the usage increases or condition degrades. It is also assumed that the degree of increasing vibration is monotonic.

FIG. 1 illustrates an example block diagram of a local computer 101 in a part of an IoT system with the signal processing method in accordance with an example implementation. In this example, the local computer is connected to at least one sensor 102 and a data acquisition device (DAQ) 103 through a wideband data transmission path 104. The wideband data transmission path 104 should have more bandwidth than the bandwidth of the sensor 102, so that the sensor 102 can transmit its wideband data output.

The sensor 102 is attached at the surface of the enclosure of a machine, such as a pump or a lathe machine. The reason for not installing the sensor at the target itself is that many targets, such as a bearing or a cutting tool, are equipped in a machine. Thus, installing a sensor inside the enclosure of the machine may cause a degradation of a production quality. Such degradation can be a problem if a production line involves the machine.

In this example, the sensor 102 is a vibration sensor (accelerometer). However, other sensors, such as a microphone, an ultrasonic sensor, a current sensor, a temperature sensor, and so on may also be utilized in accordance with the desired implementation, and the present disclosure is not particularly limited thereto.

The DAQ 103 converts analog continuous data into discrete digital data at a predetermined sampling rate. In an example implementation, the sampling rate is at least double the bandwidth of the sensor 102 so that the DAQ 103 can preserve the entire signal from the sensor 102. The digitized raw data is fed to two signal processing paths in the extraction block 105; envelope detector 106 and decomposer 109.

The envelope detector 106 calculates the envelope of the input data. For example, the envelope of the input data can be calculated through applying any signal processing method, such as Hilbert transform or a low pass filter following a root-mean-square function. The purpose of calculating an envelope is to identify the important states of the machine that should be monitored when signal is extracted from input data containing both signal and noise. For example, for monitoring the usage or condition of a cutting tool of an automatic lathe machine, there can be multiple states of the machine operation such as idle state (State 1), the state of feeding a work from outside of the machine into the processing chamber of the machine (State 2), the state of placing the work at a spindle (State 3), the state of processing the work with the cutting tool (State 4), the state of removing the work from the spindle (State 5), and the state of ejecting the work from the machine and putting the work on a conveyer (State 6).

Figure 2:
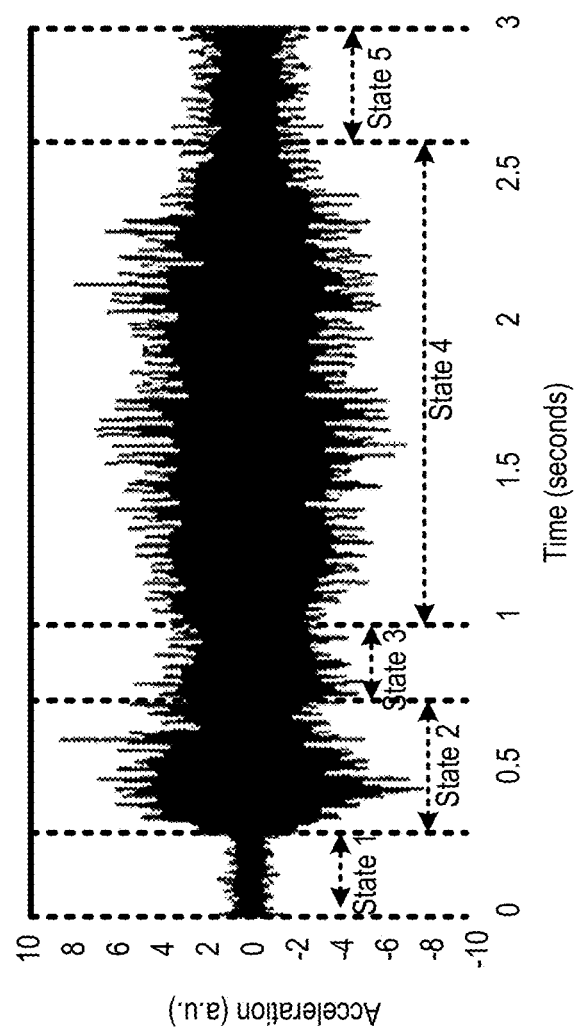
FIG. 2 illustrates an example of raw signal developed by a rotational machine, in accordance with an example implementation.

FIG. 2 illustrates an example of raw signal developed by a rotational machine, in accordance with an example implementation. In the example of FIG. 2, to monitor the usage or condition of the cutting tool through the vibration developed by friction between the cutting tool and a work, example implementations can be configured to monitor only the vibration during Phase 4, in which the cutting tool processes a work and therefore generates vibration. As shown in FIG. 2, as each state has unique vibration level and a repeating sequence. Thus, envelopes can be used to identify each state of the machine in the further analysis.

Further, as illustrated in FIG. 2, each state of the machine is not as quick as the sampling rate of the sensor data. Therefore, once the envelope of the input data is calculated, example implementations conduct down-sampling to reduce the amount of data while retaining the information regarding the machine states. Such example implementations reduce the computing resource requirements in the ensuing signal processing. In this example, the down-sampling is performed after summarizing, such as moving average (i.e. low pass filtering). Both processes are performed in the summarize and down-sampling block 107. Then the down-sampled data will be transmitted to following signal processing blocks through a narrow-band (i.e. slow sampling rate) transmission path 108.

To analyze the usage or condition of the target through vibration data, wide-band data can be more informative to obtain signal indicating the usage or condition of a machine since such wide-band data contains high frequency signal in which the modulated signal or the signal generated by the early phase of a failure may exist. Further, wideband signal demands processing resources of computers. However, as illustrated in FIG. 2, each machine state is not as quick as the sampling rate of the sensor data. Therefore, the example implementations compress the sensor data by utilizing such characteristics of the machine-related data. That is, example implementations compress wideband data in time-domain after decomposing wideband data into multiple band-limited data.

Figure 3:
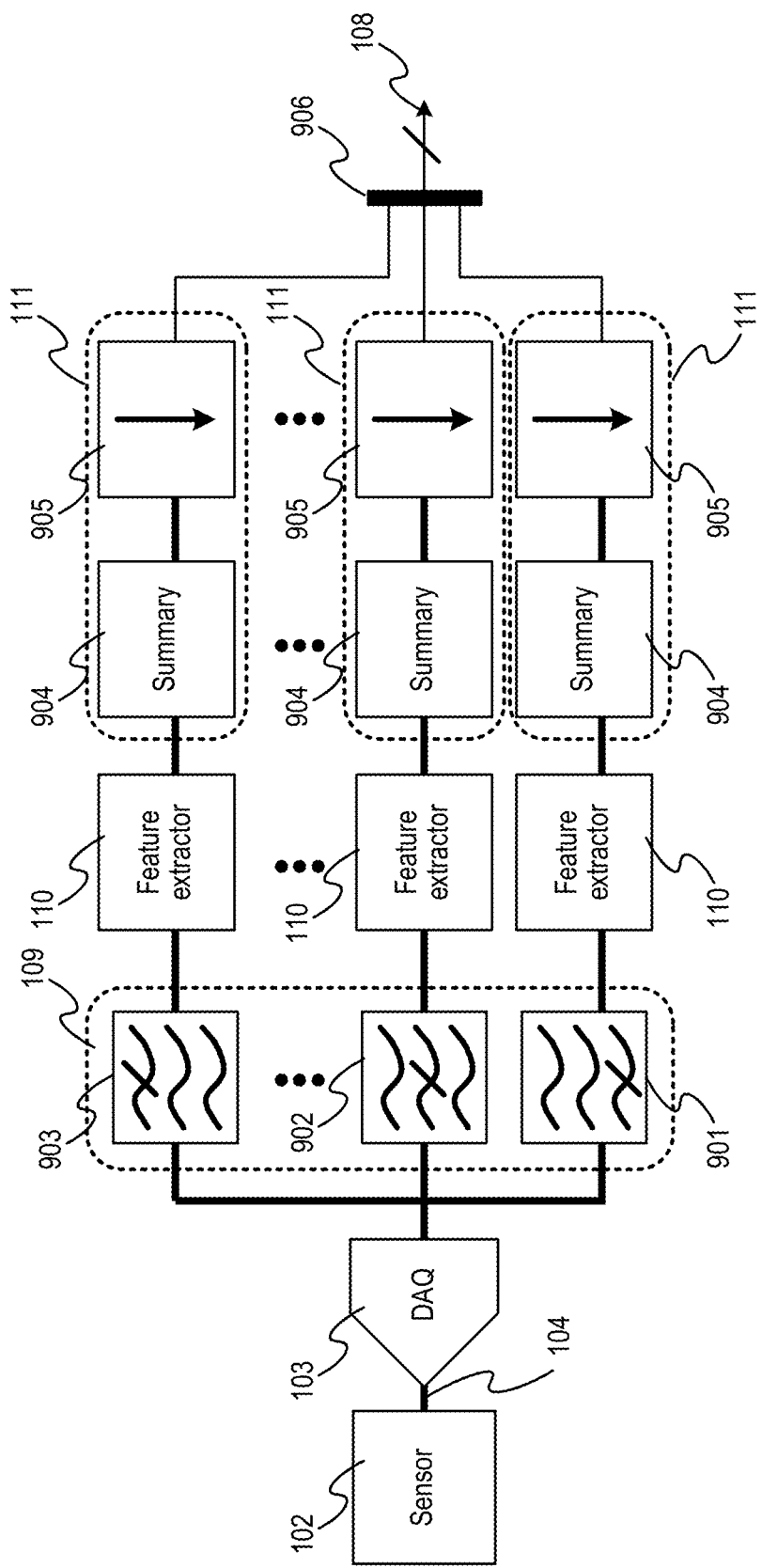
FIG. 3 illustrates an example block diagram for data compression in accordance with an example implementation.

FIG. 3 illustrates an example block diagram for data compression in accordance with an example implementation. The wideband raw data provided by the DAQ 103 is fed to following multiple filters: a low pass filter 901, a variety of band pass filters 902, and a high pass filter 903. Then each band-limited data that has only its band-limited frequency component is fed to a following feature extraction block 110. After the feature extraction, they will be summarized along the time-domain (e.g. by moving average) and down-sampled in summary calculator 904 and downsampler 905, respectively. The summarize and down-sampling block 111 can involve the summary calculator 904 and the down-sampler 905.

Implementing a filter bank that involves the low pass filter 901, the variety of band pass filters 902, and the high pass filter 903 is one example to achieve the signal decomposing. After the filtering at each filter of the filter bank, example implementations can calculate root-mean-square, peak-to-peak, crest factor, or kurtosis to extract feature values of each data band at each feature extractor 110. In the following explanation, the output of feature extract 110 is referred to as "feature value." As these filtering processes are independent each other, example implementations can calculate the feature values in parallel to reduce the calculation time.

FFT (Fast Fourier transform) method is another example that can be used to facilitate the signal decomposition. When FFT methods are applied, example implementations can combine the real part and the imaginary part as magnitude to get the absolute strength of the vibration. Such data conversion may be also done in the feature extractor 110. In the following example, FFT is utilized as a signal decomposition method.

If the summary calculator 904 and the down-sampler 905 are applied before decomposing the raw data into multiple band-limited data, aliasing will combine all the frequency band data into one narrow band. Therefore, the signal in high-frequency band may no longer be detectable in the following signal processing (this can be referred as low signal-to-noise ratio). However, since the disclosed method decomposes the data into multiple band-limited data, down-sampling at each band-limited data will not cause serious degradation of the signal-to-noise ratio due to aliasing due to the suppression of out-of-band data at each band-limited data.

Finally, each down-sampled band-limited data will be bundled at multiplexer 906. Then the bundled data will be fed to the next step through the narrow-band multiplexed data path 108.

Both the envelope data and decomposed band-limited data are synchronized and paired in the pairing block 112, as shown in FIG. 1. Then the data pair will be fed to further signal analysis block 114 through the inter-module interface 113. The advantage of the synchronization between the envelope data and decomposed band-limited data is that the signal analysis block 114 can label each decomposed band-limited data in accordance with the labels of the envelope data. Then the signal analysis block 114 picks out at least one data pair that corresponds to the state in which the target generates vibration. In this example, the signal analysis block 114 picks out only Phase 4.

Once the pairing block 112 sends the paired data to the signal analysis block 114, the raw data with high sampling rate is no longer required. That means new raw data, as provided by sensor 102, can be stored in the same memory area or storage area as the previous raw sensor data. Such implementations thereby reduce the requirement for storage capacity.

Figure 4:
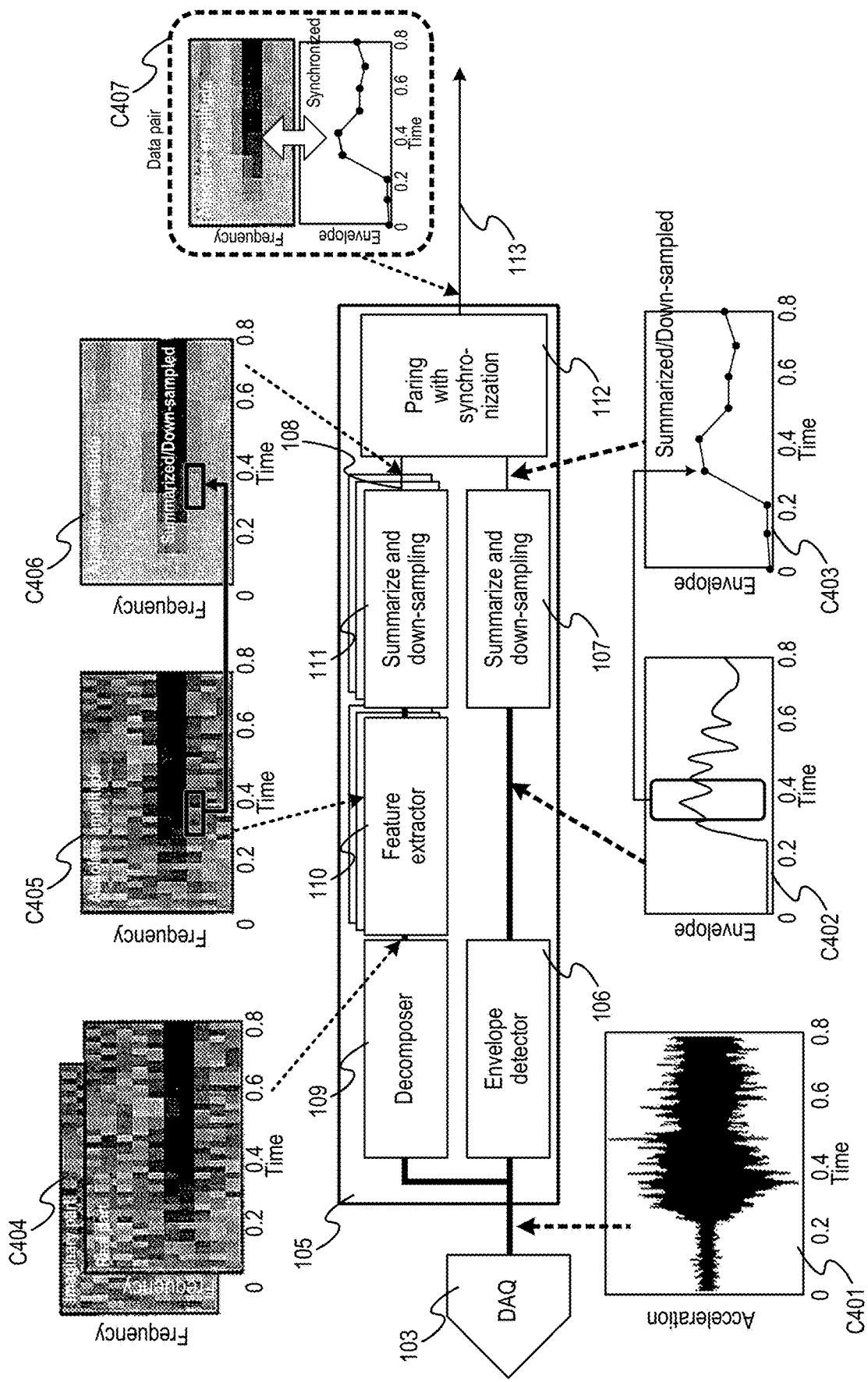
FIG. 4 illustrates an example expression of data processing at each processing block, in accordance with an example implementation.

FIG. 4 illustrates an example expression of data processing at each processing block, in accordance with an example implementation. In FIG. 4, some qualitative charts of data in each block are shown. The raw data with the sampling rate of 20 kHz is shown as shown in C401. Then, the envelope of the raw signal is calculated as shown in C402. After that, that envelope data is down-sampled at 10 Hz (Sampling cycle: 0.1 seconds) as shown in C403.

The decomposer 109 decomposes the raw data into multiple band-limited data. As FFT is applied in this example, the real and imaginary portions of the data of each multiple band-limited data is obtained as shown in C404. The feature extractor 110 calculates the absolute amplitude (C405) and transmit it to the summarize and down-sampling block 111. Each decomposed band-limited data has some redundancy along the time-domain due to the slow transitions between machine states. Therefore, compression along the time-domain within each of the machine states after decomposing data into multiple band-limited data will not cause much information loss even if the signal is high frequency. In the summarize and down-sampling block 111, the absolute amplitude of FFT is summarized by down-sampling at every 0.1 seconds as shown in C406. Finally, the paired data C407 is fed to the following signal analysis block 114 after the synchronization with the envelope data.

Quantitatively, for example, if a sampling rate is 20 kHz and the number of FFT points is 256, the decomposer 109 creates 128 band-limited data (since the number of FFT points is 256) with the bandwidth of (20000 Hz/128=156.25 Hz) from DC to 10 kHz. Therefore, the first band-limited data may have a frequency component from DC to 156.25 Hz, the second one may have 156.25 Hz to 312.5 Hz, and the last one has from 9843.75 Hz to 10 kHz. Regarding the down-sampling cycle for compression, as shown in FIG. 2, each state lasts at least 250 milliseconds in this example. Therefore, the down-sampling cycle for each band-limited data may be set to a number up to every 250 milliseconds for data compression. By setting the down-sampling cycle to be less than the duration of each of the expected machine states but more than the original sampling cycle, the amount of data can be decreased while maintaining the information regarding the target machine's information of each states. Alternatively the signal analysis block 114 could analyze a significant change in the envelope to find the change of the states and set a value less than the minimum duration among each change as the down-sampling cycle to the decomposer 109.

Figure 5:
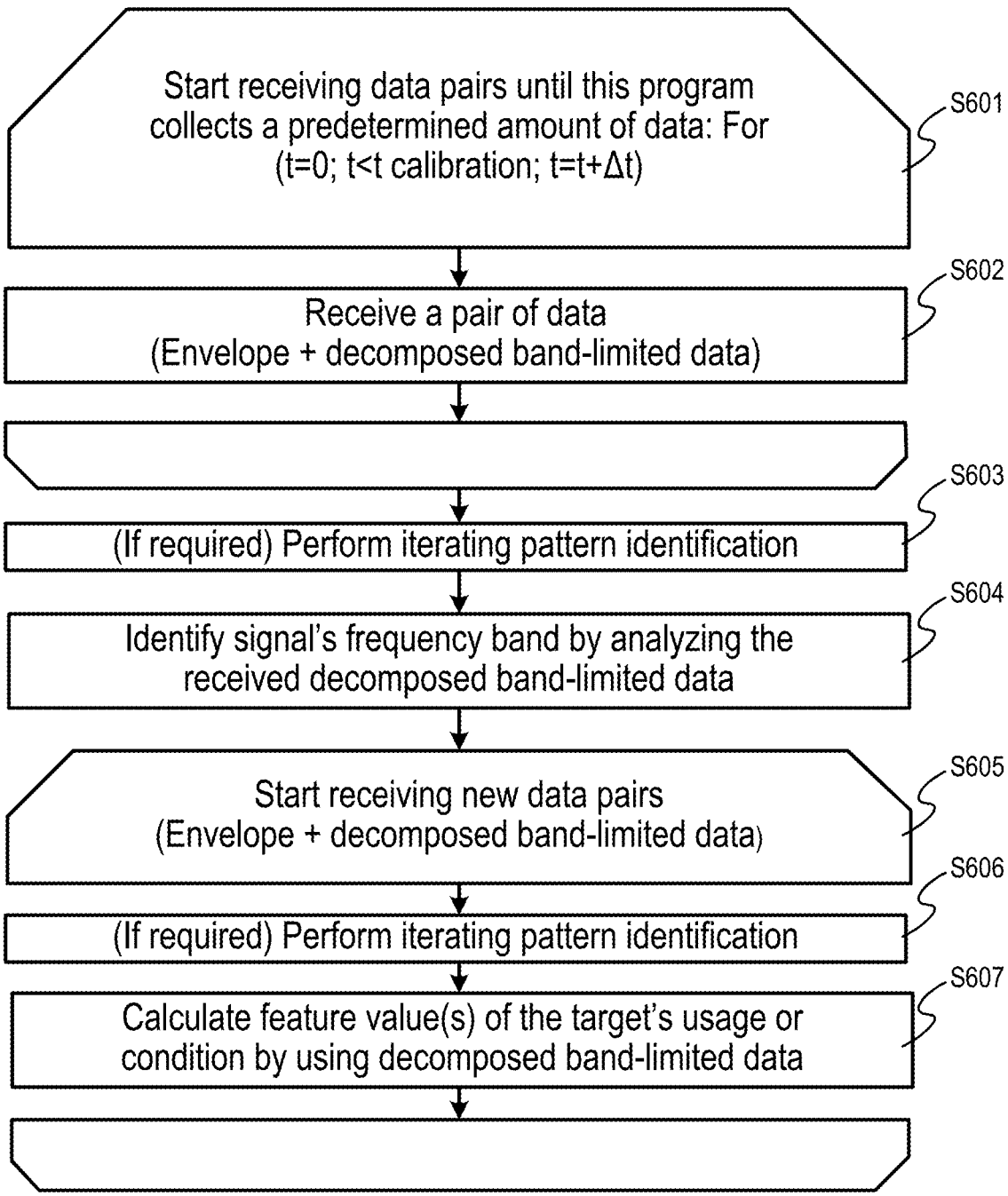
FIG. 5 illustrates an example flow chart of the signal analysis block, in accordance with an example implementation.

FIG. 5 illustrates an example flow chart of the signal analysis block 114, in accordance with an example implementation. Firstly, in S601, the signal analysis block 114 starts receiving data pairs until a predetermined condition is met (e.g., a predetermined amount of data is stored, a certain period of time has elapsed, and so on in accordance with the desired implementation). More specifically, S601 collects data pairs with sampling rate of Δt until the sum of the data length reaches t calibration (S602).

Then, at S603, the signal analysis block 114 performs the iterating pattern identification to identify and categorize the states of a machine for the monitoring target. If the machine has only binary states (e.g., a simple rotational machine which has only "on" and "off."), this process may be skipped. More specifically, S603 calculates autocorrelation of the envelope to identify an iterating pattern. As the target machine iterates the same manufacturing process, it is expected that the machine spends the same time for each single manufacturing process. Therefore, autocorrelation of the envelope data will reveal the cycle, denoted as T seconds, of a single manufacturing process. Then, the signal analysis block 114 finds one T-second representative waveform pattern that appears repeatedly in the envelope data. This pattern is referred to as a "template." This process is realized by, for example, picking out a T-second envelope data that has relatively small amplitude in the beginning and the ending part of the T seconds data while showing relatively large amplitude in the middle of the envelope data. An example of such a template is illustrated in FIG. 2 Once the T seconds representative pattern is identified, the signal analysis block 114 extracts all the similar patterns from the envelope data set provided from S601 and S602. A cross-correlation calculation or Euclid distance calculation may be applied to extract similar patterns.

At S604, the signal analysis block 114 performs a frequency band identification process by using each of the band-limited data feature values which as stored in S601 and S602. In this process, a frequency band, in which a monotonic trend of the feature value in accordance with the usage or condition of the machine is identified if it exists. For example, a curve fitting to a first-order polynomial is applied to band-limited data feature values. Then, a fitting-error calculation is performed to extract a trend of each feature values and evaluate its monotonicity in accordance with the usage or condition of the machine. A frequency band of the band-limited data with the minimum-fitting-error is then referred to as the "signal frequency band." Alternatively, if the target of a measurement is consumable items which are replaced almost periodically, calculating autocorrelations of feature values of each band-limited data and extracting a frequency band which has a strong correlation around the replacement cycle of the consumable will reveal the signal frequency band.

Once the signal frequency band is identified, the measurement phase (S605, S606, and S607) is executed. The calibration phase refers to the process of S601, S602, S603, and S604. In the measurement phase, the signal analysis block 114 starts receiving data again in S605. If required, S606 extracts patterns that are similar to the template identified in S603. S607 calculates feature values within the signal frequency band only. In the calibration phase, it was verified that the feature values of the data within the signal frequency band indicate the usage or condition of the target.

The output of S607 corresponds to the usage or condition of the target. If the output of S607 increases expectedly, there may be a problem in the target. In such a case, the signal analysis block 114 may send an alert to the other computer on the network 115. In contrast, if there fewer feature values than the expectation, then planned maintenance may be postponed.

The measurement process of S605, S606, and S607 continues unless it receives a request to stop from the other computer on the network 115.

The above system and signal processing method provides not only compression of sensor data through calculating the feature values of the target, but also identification of a signal frequency band containing the signal developed by the target device. Such implementations reduce the computing resource requirement thanks to the disclosed signal processing method which compresses the high-sampling-rate data by utilizing the characteristic of the machine states transitions.

Figure 6:
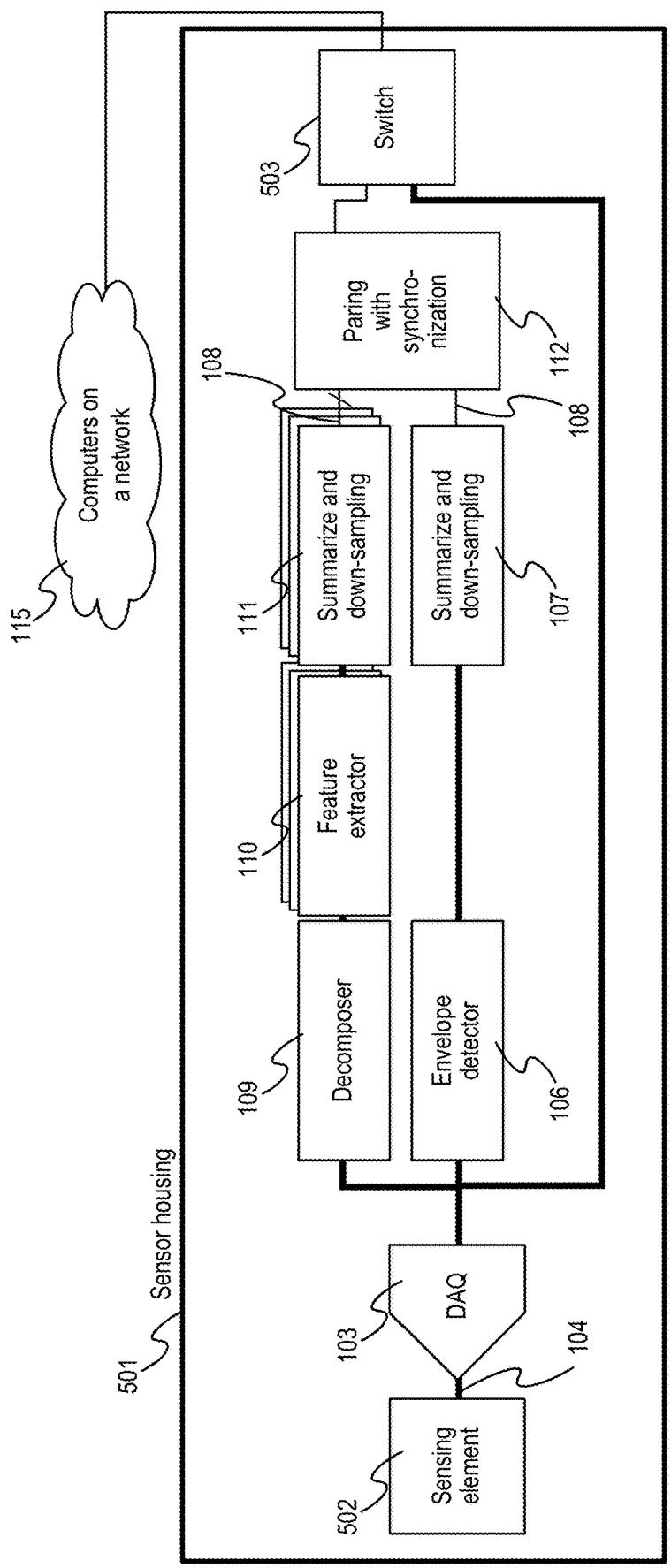
FIG. 6 illustrates an example block diagram of a local computer in accordance with another example implementation.

FIG. 6 illustrates an example block diagram of a local computer in accordance with another example implementation. In a second example implementation, a sensor housing 501 involves a sensing element 502, a wideband data transmission path 104, a data acquisition device (DAQ) 103, an envelope detector 106, a summarize and downsampling block 107, a narrow-band transmission path 108 a decomposer 109, a feature extractor 110, a summarize and down-sampling block 111, and a switch 503.

The sensor housing 501 may be functional as a pure sensor. As it includes the sensor element 502 and the following signal processing blocks, the switch 503 switches the data path so that a user or other computers on a network can get the raw data (output of the DAQ 103) directly if needed. On the other hand, since the all the functionality of the first example implementation is also provided, other computers on a network can also obtain feature signals of the target with the appropriate compressions as well. The switch 503 is controllable by the computers on a network 115 and a manual switch equipped in the sensor housing 501.

In an example implementation, the switch 503 realizes the both functionality of a typical sensor and a vibration analysis. This gives the sensor housing 501 flexible capability from the IoT system design perspective.

Figure 7:
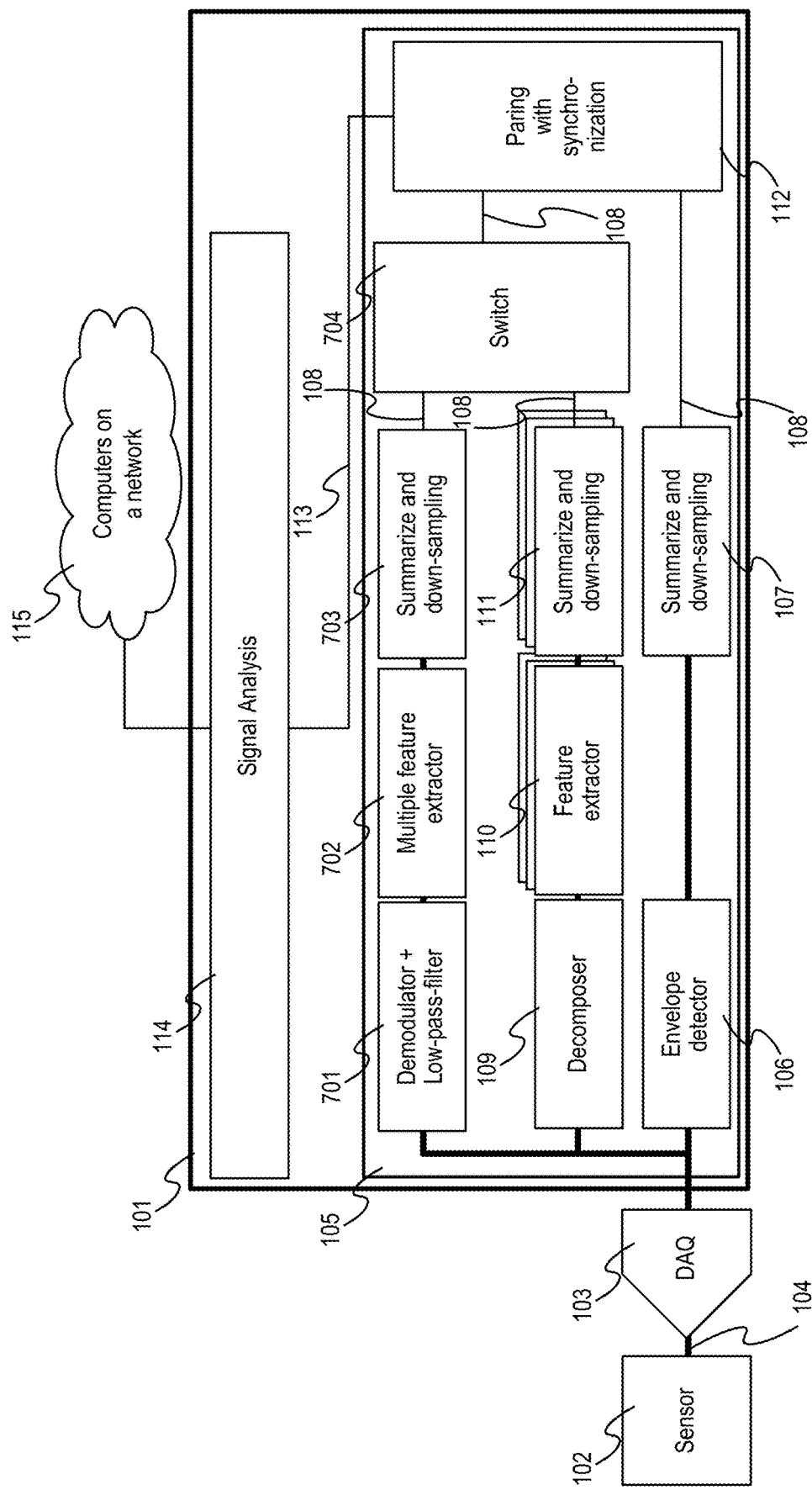
FIG. 7 illustrates an example block diagram of a local computer in accordance with another example implementation.

FIG. 7 illustrates an example block diagram of a local computer in accordance with another example implementation. In a third example implementation, in addition to the first example implementation, a demodulator 701, a low pass filter 702, summarize and down-sampling block 703, and a switch 704 are equipped in the extraction block 105 as shown in FIG. 7. In addition, decomposer 109 uses FFT to decompose data into multiple band-limited data since applying a filter bank generally requires more calculation resources than FFT. Before the transition to the measurement phase, the extraction block 105 works in the same manner as the first example implementation.

In the measurement phase, the extraction block 105 starts using the demodulator 701, the low pass filter 702, and the summarize and down-sampling block 703, instead of using decomposer 109 with FFT. Such implementations facilitate extracting feature signals so that the extraction block 105 can provide a variety of feature values, such as crest factor and kurtosis which requires time-series data to calculate.

In the third example implementation, the extraction block 105 uses FFT in the calibration phase and the demodulator 701 in the measurement phase respectively. Once the identification of the signal frequency band, which indicates feature values increasing in accordance with a usage or condition of the machine, only one bandpass filter is needed for passing the signal frequency band. Such example implementations eliminate the need for redundant computing resources. As a result, the third example implementation is able to provide a variety of feature values in the measurement phase while keeping the reduced resource requirement in the calibration phase by placing the switch 704.

Figure 8:
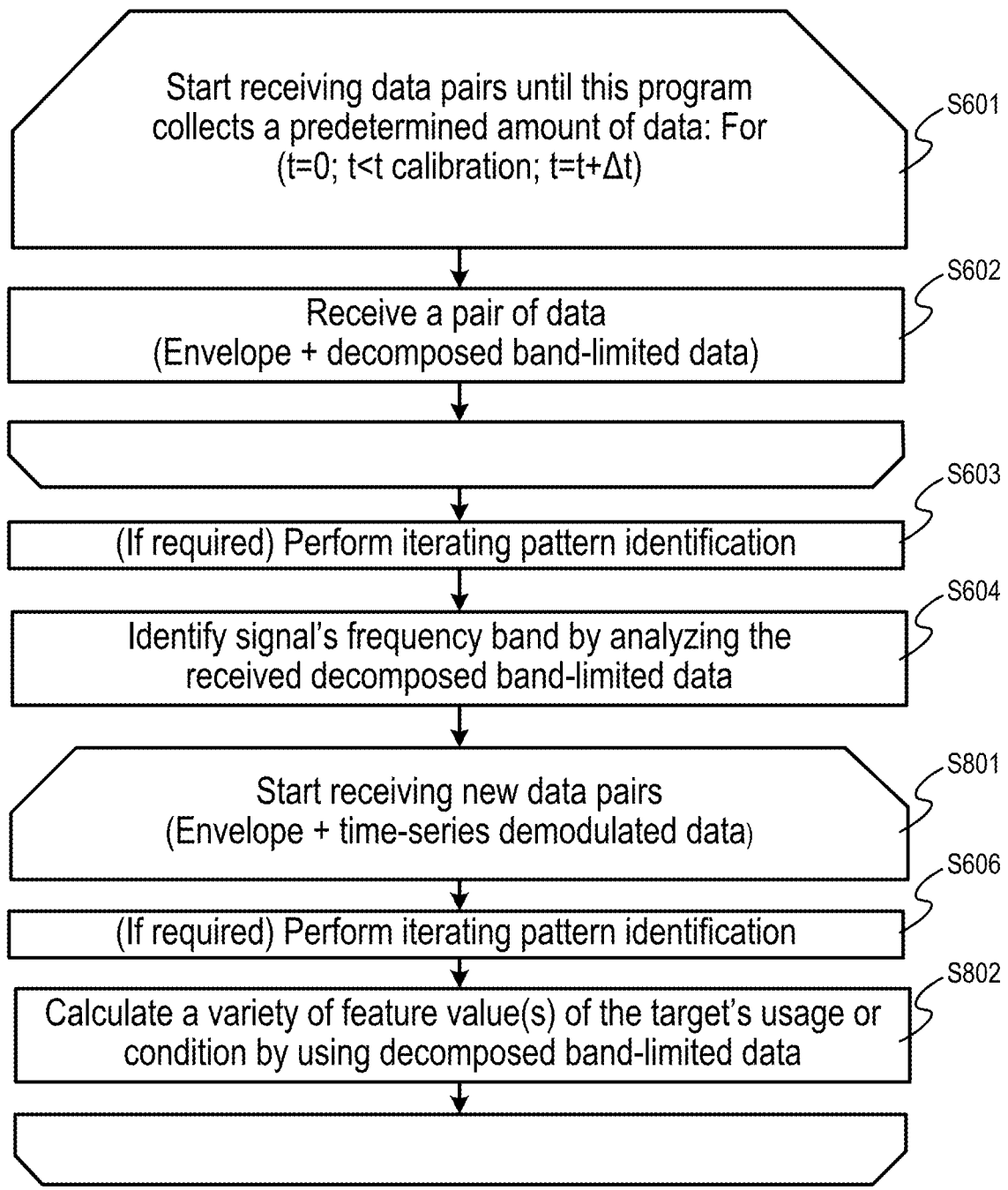
FIG. 8 illustrates an example flow chart of the IoT system analysis, in accordance with an example implementation.

FIG. 8 illustrates an example flow chart of the IoT system analysis, in accordance with an example implementation. Specifically, FIG. 8 illustrates the flow chart for the signal analysis block 114, in accordance with the third example implementation. In FIGS. 8, S605 and S607 in FIG. 5 is replaced with S801 and S802 respectively. S801 collects the time-series demodulated signal instead of band-limited data calculated by FFT. S802 calculates a variety of feature values from the time-series demodulated signal and down-samples them at the summarize and down-sampling block 703.

By providing a variety of feature values, the signal analysis block 114 can provide a more accurate usage or condition of the target due to having more information than the signal analysis involving single kind of feature signals. Such example implementations can be useful for having multiple inputs such as artificial neural networks to the signal analysis block 114 or other further analysis.

Example implementations can thereby realize data compression without serious disruption of information when a usage or a condition of a mechanical part inside a machine is monitored.

Figure 9:
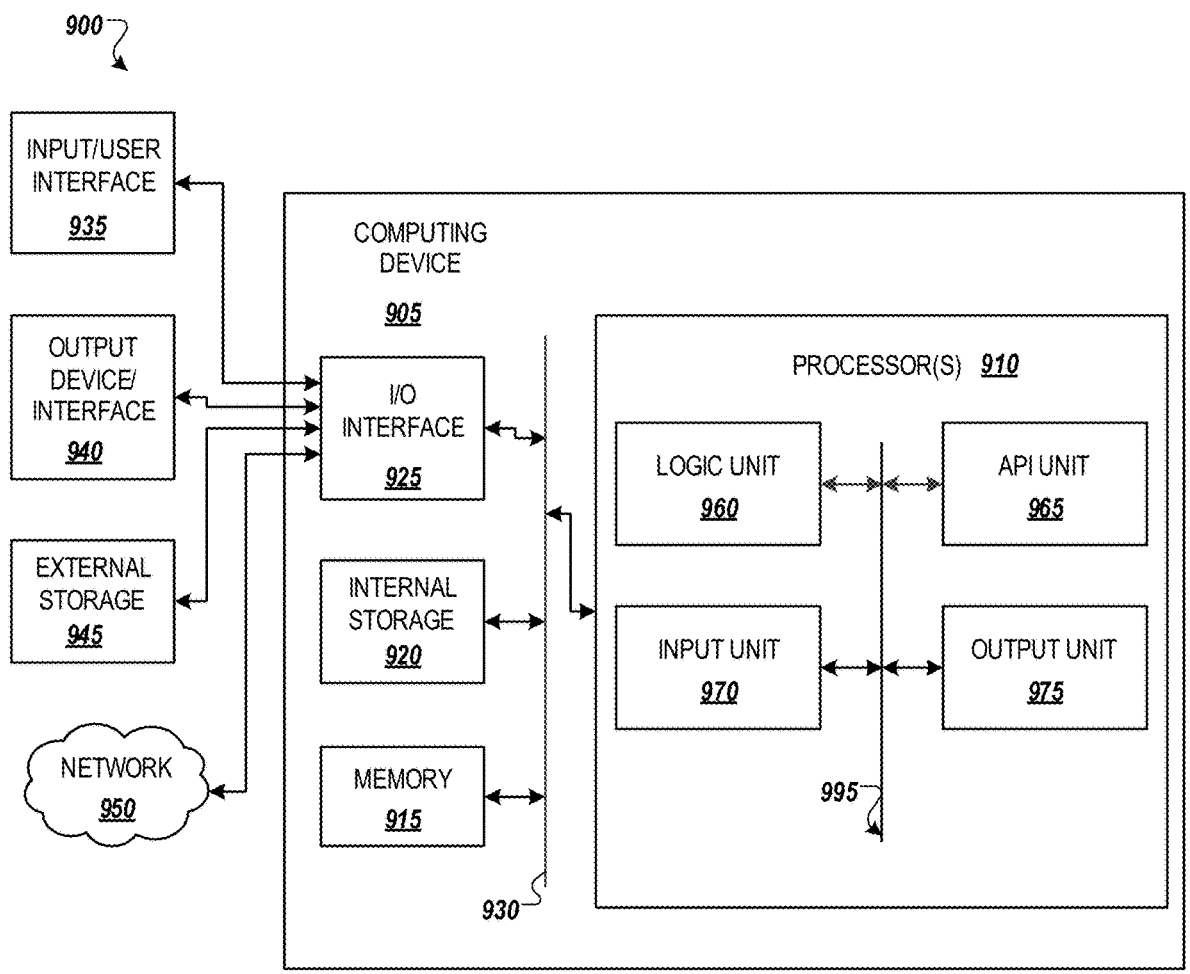
FIG. 9 illustrates an example computing environment with an example computer device suitable for use in some example implementations.

FIG. 9 illustrates an example computing environment with an example computer device suitable for use in some example implementations, such as a computer, a server, or an Internet of Things (IoT) device integrated with a sensor configured to provide the sensor data as illustrated in FIG. 6. In example implementations, other apparatuses can also be utilized that provide a common enclosure or apparatus housing to a system involving a processor 910 integrated with a sensor to facilitate the desired physical implementation for an apparatus configured to manage a machine having a plurality of machine states. Computer device 905 in computing environment 900 can include one or more processing units, cores, or processors 910, memory 915 (e.g., RAM, ROM, and/or the like), internal storage 920 (e.g., magnetic, optical, solid state storage, and/or organic), and/or IO interface 925, any of which can be coupled on a communication mechanism or bus 930 for communicating information or embedded in the computer device 905. IO interface 925 is also configured to receive images from cameras or provide images to projectors or displays, depending on the desired implementation.

Computer device 905 can be communicatively coupled to input/user interface 935 and output device/interface 940. Either one or both of input/user interface 935 and output device/interface 940 can be a wired or wireless interface and can be detachable. Input/user interface 935 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 940 may include a display, television, monitor, printer, speaker, braille, or the like. In some example implementations, input/user interface 935 and output device/interface 940 can be embedded with or physically coupled to the computer device 905. In other example implementations, other computer devices may function as or provide the functions of input/user interface 935 and output device/interface 940 for a computer device 905.

Examples of computer device 905 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computer device 905 can be communicatively coupled (e.g., via IO interface 925) to external storage 945 and network 950 for communicating with any number of networked components, devices, and systems, including one or more computer devices of the same or different configuration. Computer device 905 or any connected computer device can be functioning as, providing services of, or referred to as a server, client, thin server, general machine, special-purpose machine, or another label.

IO interface 925 can include, but is not limited to, wired and/or wireless interfaces using any communication or IO protocols or standards (e.g., Ethernet, 802.11x, Universal System Bus, WiMax, modem, a cellular network protocol, and the like) for communicating information to and/or from at least all the connected components, devices, and network in computing environment 900. Network 950 can be any network or combination of networks (e.g., the Internet, local area network, wide area network, a telephonic network, a cellular network, satellite network, and the like).

Computer device 905 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computer device 905 can be used to implement techniques, methods, applications, processes, or computer-executable instructions in some example computing environments. Computer-executable instructions can be retrieved from transitory media, and stored on and retrieved from non-transitory media. The executable instructions can originate from one or more of any programming, scripting, and machine languages (e.g., C, C++, C #, Java, Visual Basic, Python, Perl, JavaScript, and others).

Processor(s) 910 can execute under any operating system (OS) (not shown), in a native or virtual environment. One or more applications can be deployed that include logic unit 960, application programming interface (API) unit 965, input unit 970, output unit 975, and inter-unit communication mechanism 995 for the different units to communicate with each other, with the OS, and with other applications (not shown). The described units and elements can be varied in design, function, configuration, or implementation and are not limited to the descriptions provided. Processor(s) 910 can be in the form of hardware processors such as central processing units (CPUs) or in a combination of hardware and software units.

In some example implementations, when information or an execution instruction is received by API unit 965, it may be communicated to one or more other units (e.g., logic unit 960, input unit 970, output unit 975). In some instances, logic unit 960 may be configured to control the information flow among the units and direct the services provided by API unit 965, input unit 970, output unit 975, in some example implementations described above. For example, the flow of one or more processes or implementations may be controlled by logic unit 960 alone or in conjunction with API unit 965. The input unit 970 may be configured to obtain input for the calculations described in the example implementations, and the output unit 975 may be configured to provide output based on the calculations described in example implementations.

Processor(s) 910 can be configured to decompose sensor data over a plurality of band-limited data to generate a decomposed sensor data as illustrated at 109 of FIGS. 1, 4, 6 and 7; extract an envelope from the sensor data as illustrated at 106 of FIGS. 1, 4, 6, and 7; execute downsampling on the extracted envelope and the decomposed sensor data to generate a downsampled envelope and downsampled decomposed sensor data as illustrated at 107 and 111 of FIGS. 1, 4, 6, and 7; and synchronize the downsampled envelope with the downsampled decomposed sensor data as a data pair as illustrated at 112 of FIGS. 1, 4, 6 and 7. Depending on the desired implementation, processor(s) 910 can be configured to decompose the sensor data through a Fast Fourier Transform (FFT) as described herein. Through such example implementations, the calculation of the feature values into a decomposed signal before downsampling allows the retention of the high-frequency-band signal of the sensor output. The downsampling facilitates the compression of data which relaxes the storage/bandwidth/processing requirements of the IoT system in consideration of vibration monitoring. The calculation and downsampling of the signal envelope retains information regarding the condition of the machine following the signal processing. The synchronization of the results as a data pair allows for the envelope and spectrum data to be synchronized.

Processor(s) 910 can be further configured to collect data pairs until a predetermined condition is met (e.g., the condition can involve, but is not limited to, a specific desired timing or data amount, and so on); identify a signal frequency band of the sensor data from the downsampled decomposed sensor data; and for generation of subsequent data pairs, determine feature values within the signal frequency band from the subsequent data pairs as illustrated in FIG. 5. Depending on the desired implementation, the generation of the subsequent data pairs can be conducted through a demodulator and a low-pass filter configured according to the identified signal frequency band as illustrated in FIG. 7. The signal frequency band can be determined based on determining the frequency having a signal value that satisfies a predetermined condition. The identified frequency band can thereby be stored into memory 915 for future reference.

Processor(s) 910 can be further configured to collect data pairs until a threshold is met; identify a signal frequency band of the sensor data from the downsampled decomposed sensor data; and for generation of subsequent data pairs involving the downsampled envelope and downsampled demodulated sensor data in time-series, determine feature values from the subsequent data pairs as illustrated in FIG. 8. Processor(s) 910 can be configured to manage sensor data from a machine having a plurality of machine states, by decomposing sensor data into a plurality of band-limited data to generate a decomposed sensor data as illustrated at 109 of FIGS. 1, 4, 6 and 7; and executing downsampling on each of the decomposed sensor data to generate downsampled decomposed sensor data as illustrated at 107 and 111 of FIGS. 1, 4, 6, and 7. Depending on the desired implementation the downsampling cycle can be shorter than the duration of the each of the machine states, as illustrated at 109 of FIG. 1.

Processor(s) 910 can be further configured to extract feature values from the each of the decomposed sensor data as illustrated at 110 of FIG. 1. As described in FIG. 1, the downsampling can be conducted based on the extracted feature values to generate the downsampled decomposed sensor data.

Some portions of the detailed description are presented in terms of algorithms and symbolic representations of operations within a computer. These algorithmic descriptions and symbolic representations are the means used by those skilled in the data processing arts to convey the essence of their innovations to others skilled in the art. An algorithm is a series of defined steps leading to a desired end state or result. In example implementations, the steps carried out require physical manipulations of tangible quantities for achieving a tangible result.

Unless specifically stated otherwise, as apparent from the discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

Example implementations may also relate to an apparatus for performing the operations herein. This apparatus may be specially constructed for the required purposes, or it may include one or more general-purpose computers selectively activated or reconfigured by one or more computer programs. Such computer programs may be stored in a computer readable medium, such as a computer-readable storage medium or a computer-readable signal medium. A computer-readable storage medium may involve tangible mediums such as, but not limited to optical disks, magnetic disks, read-only memories, random access memories, solid state devices and drives, or any other types of tangible or non-transitory media suitable for storing electronic information. A computer readable signal medium may include mediums such as carrier waves. The algorithms and displays presented herein are not inherently related to any particular computer or other apparatus. Computer programs can involve pure software implementations that involve instructions that perform the operations of the desired implementation.

Various general-purpose systems may be used with programs and modules in accordance with the examples herein, or it may prove convenient to construct a more specialized apparatus to perform desired method steps. In addition, the example implementations are not described with reference to any particular programming language. It will be appreciated that a variety of programming languages may be used to implement the teachings of the example implementations as described herein. The instructions of the programming language(s) may be executed by one or more processing devices, e.g., central processing units (CPUs), processors, or controllers.

As is known in the art, the operations described above can be performed by hardware, software, or some combination of software and hardware. Various aspects of the example implementations may be implemented using circuits and logic devices (hardware), while other aspects may be implemented using instructions stored on a machine-readable medium (software), which if executed by a processor, would cause the processor to perform a method to carry out implementations of the present application. Further, some example implementations of the present application may be performed solely in hardware, whereas other example implementations may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

Moreover, other implementations of the present application will be apparent to those skilled in the art from consideration of the specification and practice of the teachings of the present application. Various aspects and/or components of the described example implementations may be used singly or in any combination. It is intended that the specification and example implementations be considered as examples only, with the true scope and spirit of the present application being indicated by the following claims.

What is claimed is:

1. A method for managing sensor data from a machine having a plurality of machine states, the method comprising:
    decomposing sensor data into a plurality of band-limited data to generate a decomposed sensor data; and
    executing downsampling on each of the decomposed sensor data to generate downsampled decomposed sensor data;
    wherein the downsampling cycle is shorter than a duration of the each of the machine states, and
    wherein the downsampled decomposed sensor data is implemented to identify a signal frequency band containing a signal developed by the machine
    where the method further includes:
    extracting an envelope from the sensor data;
    executing downsampling on the extracted envelope to generate a downsampled envelope;
    synchronizing the downsampled envelope with the downsampled decomposed sensor data as data pairs,
    collecting the data pairs until a predetermined condition is met;
    identifying, from the downsampled decomposed sensor data, the signal frequency band having a signal value satisfying another predetermined condition, and
    storing the identified signal frequency band.

2. The method of claim 1, further comprising:
    extracting feature values from the each of the decomposed sensor data,
    wherein the downsampling is conducted based on the extracted feature values to generate the downsampled decomposed sensor data.

3. The method of claim 1, further comprising:
    extracting feature values from each of the decomposed sensor data,
    wherein the downsampling is conducted based on the extracted feature values to generate the downsampled decomposed sensor data, and
    wherein the extracting feature values is conducted from the decomposed sensor data of the identified signal frequency band.

4. The method of claim 3, wherein generation of subsequent data is conducted through a demodulator and a low-pass filter configured according to the identified signal frequency band.

5. The method of claim 1, wherein the decomposing the sensor data is conducted through a Fast Fourier Transform (FFT).

6. The method of claim 1, wherein the method is executed by a processor integrated with a sensor configured to provide the sensor data with a common enclosure.

7. A non-transitory computer readable medium, storing instructions for managing sensor data from a machine having a plurality of machine states, the instructions comprising:
    decomposing sensor data into a plurality of band-limited data to generate a decomposed sensor data; and
    executing downsampling on each of the decomposed sensor data to generate downsampled decomposed sensor data;
    wherein the downsampling cycle is shorter than a duration of the each of the machine states,
    wherein the downsampled decomposed sensor data is implemented to identify a signal frequency band containing a signal developed by the machine
    wherein the instructions further includes:
    extracting an envelope from the sensor data;
    executing downsampling on the extracted envelope to generate a downsampled envelope; and
    synchronizing the downsampled envelope with the downsampled decomposed sensor data as data pairs
    collecting the data pairs until a predetermined condition is met;
    identifying, from the downsampled decomposed sensor data, the signal frequency band having a signal value satisfying another predetermined condition; and
    storing the identified signal frequency band.

8. The non-transitory computer readable medium of claim 7, the instructions further comprising:
    extracting feature values from the each of the decomposed sensor data,
    wherein the downsampling is conducted based on the extracted feature values to generate the downsampled decomposed sensor data.

9. The non-transitory computer readable medium of claim 7, the instructions further comprising:
    extracting feature values from each of the decomposed sensor data;
    wherein the downsampling is conducted based on the extracted feature values to generate the downsampled decomposed sensor data, and
    wherein the extracting feature values is conducted from the decomposed sensor data of the identified signal frequency band.

10. The non-transitory computer readable medium of claim 9, wherein generation of subsequent data is conducted through a demodulator and a low-pass filter configured according to the identified signal frequency band.

11. The non-transitory computer readable medium of claim 7, wherein the decomposing the sensor data is conducted through a Fast Fourier Transform (FFT).

12. The non-transitory computer readable medium of claim 7, wherein the instructions are executed by a processor integrated with a sensor configured to provide the sensor data with a common enclosure.

* * * * *